United States Patent
Lin et al.

(10) Patent No.: US 11,895,565 B2
(45) Date of Patent: Feb. 6, 2024

(54) APPARATUS AND METHOD OF VEHICLE-TO-EVERYTHING COMMUNICATION OF SAME

(71) Applicant: GUANGDONG OPPO MOBILE TELECOMMUNICATIONS CORP., LTD., Guangdong (CN)

(72) Inventors: Huei-Ming Lin, South Yarra (AU); Zhenshan Zhao, Guangdong (CN); Qianxi Lu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 424 days.

(21) Appl. No.: 17/213,148

(22) Filed: Mar. 25, 2021

(65) Prior Publication Data
US 2021/0219111 A1 Jul. 15, 2021

Related U.S. Application Data

(63) Continuation of application No. PCT/CN2018/107607, filed on Sep. 26, 2018.

(51) Int. Cl.
| | |
|---|---|
| *H04L 1/1607* | (2023.01) |
| *H04W 4/08* | (2009.01) |
| *H04W 4/40* | (2018.01) |
| *H04W 4/06* | (2009.01) |
| *H04W 72/02* | (2009.01) |

(Continued)

(52) U.S. Cl.
CPC .............. *H04W 4/40* (2018.02); *H04L 1/1614* (2013.01); *H04W 4/06* (2013.01); *H04W 72/02* (2013.01); *H04W 72/0446* (2013.01); *H04W 92/18* (2013.01)

(58) Field of Classification Search
CPC ......... H04W 4/40; H04W 4/60; H04W 72/02; H04W 72/0446; H04W 92/18
See application file for complete search history.

(56) References Cited

U.S. PATENT DOCUMENTS

| | | |
|---|---|---|
| 2013/0225184 A1 | 8/2013 | Liu et al. |
| 2016/0205713 A1 | 7/2016 | Seo |

(Continued)

FOREIGN PATENT DOCUMENTS

| | | |
|---|---|---|
| CN | 107371182 | 11/2017 |
| CN | 107592327 | 1/2018 |

(Continued)

OTHER PUBLICATIONS

TSG-CT WG3 Meeting#118e, C3-215101 (Year: 2021).*

(Continued)

*Primary Examiner* — Faruk Hamza
*Assistant Examiner* — Abusayeed M Haque
(74) *Attorney, Agent, or Firm* — Hodgson Russ LLP

(57) ABSTRACT

An apparatus and a method of vehicle-to-everything (V2X) communication of same are provided. The apparatus is a local header. The method includes pre-allocating a plurality of transmission opportunities of a plurality of sidelink (SL) resources in a time domain multiplexed (TDM'ed) manner, and coordinating transmission timings between a plurality of group member user equipments (UEs) in a unicast session or a groupcast session.

6 Claims, 4 Drawing Sheets

300

302 — Pre-allocating a plurality of transmission opportunities of a plurality of sidelink (SL) resources in a time domain multiplexed (TDM'ed) manner 304 — Coordinating transmission timings between a plurality of group member user equipments (UEs) in a unicast session or a groupcast session

(51) Int. Cl.
*H04W 72/0446* (2023.01)
*H04W 92/18* (2009.01)

(56) References Cited

U.S. PATENT DOCUMENTS

| | | | |
|---|---|---|---|
| 2017/0215119 A1 | 7/2017 | Hong et al. | |
| 2017/0230996 A1* | 8/2017 | Li | H04W 72/20 |
| 2018/0184334 A1 | 6/2018 | Hehn et al. | |
| 2019/0174344 A1* | 6/2019 | Karella | H04W 24/10 |
| 2019/0380142 A1* | 12/2019 | Wang | H04W 72/20 |
| 2020/0053524 A1* | 2/2020 | Novlan | H04W 84/20 |
| 2020/0068609 A1* | 2/2020 | Wang | H04W 72/02 |
| 2021/0136699 A1* | 5/2021 | Scholand | H04W 4/40 |

FOREIGN PATENT DOCUMENTS

| | | | | |
|---|---|---|---|---|
| CN | 108260105 | | 7/2018 | |
| WO | WO-2019036578 A1 * | | 2/2019 | G01S 19/46 |

OTHER PUBLICATIONS

WIPO, International Search Report and Written Opinion for PCT/CN2018/107607, dated Jun. 25, 2019.
EPO, Extended European Search Report for EP Application No. 18935797.3, dated Dec. 2, 2021.
EPO, Communication for EP Application No. 18935797.3, dated Sep. 20, 2023.

* cited by examiner

APPARATUS AND METHOD OF VEHICLE-TO-EVERYTHING COMMUNICATION OF SAME

CROSS-REFERENCE

This application is a continuation of International Application No. PCT/CN2018/107607, filed Sep. 26, 2018, the entire disclosure of which is incorporated herein by reference.

BACKGROUND OF DISCLOSURE

1. Field of the Disclosure

The present disclosure relates to the field of communication systems, and more particularly, to an apparatus and a method of vehicle-to-everything (V2X) communication of same.

2. Description of the Related Art

As part of evolution of intelligent transportation systems (ITS), more advanced applications and services that require direct vehicle-to-everything (V2X) communication to increase safety of road users, improve efficiency of traffic flow, minimize environmental impact, and enhance road travel experience for passengers are constantly being developed by the automotive industry and regulation bodies around the world. In order to assist achieving these ITS objectives, wireless standards organizations such as institute of electrical and electronic engineering (IEEE) and 3rd generation partnership project (3GPP) are exploiting new technologies to enable faster and more reliable transfer of V2X data between different nodes and user equipment (UE) on the road. One way to improve efficiency and reliability of V2X communication, compared to an existing LTE-V2X system, a next generation of technology, namely new radio V2X (NR-V2X), is looking to support unicast and groupcast type of transmissions at the physical layer.

Different from broadcast type of transmission, mechanisms for establishing a connection session for a group of communicating UEs, maintaining the connection session, and ensuring a target link performance are achieved for the connection session will need to be introduced for unicast and groupcast types of transmission. Since V2X data traffic from each group member UE in a unicast/groupcast session can occur at any time and most of V2X transmissions over NR sidelink interface are likely to be confined within same set of radio resources and carriers, transmission (Tx) collisions between different UEs or even between group member UEs of a same unicast/groupcast session can happen if there is no central control and management of SL resource usage. Consequently, reliability of sidelink communication will be degraded. In addition, with no coordination of transmission timings between group member UEs, it is possible for a UE to have miss reception of V2X messages from other group member UEs due to half-duplex limitation (i.e. not being able to "hear" from other UEs while transmitting on a same carrier). If transmission rate of the UE is high, half-duplex limitation, i.e., hear-ability problem, is even more severe. As such, a centralized SL resource coordination from a local header in a unicast/groupcast session would be necessary.

SUMMARY

In a first aspect of the present disclosure, an apparatus in a vehicle-to-everything (V2X) communication system is provided. The apparatus is a local header and includes a memory, a transceiver, and a processor coupled to the memory and the transceiver. The processor is configured to pre-allocate a plurality of transmission opportunities of a plurality of sidelink (SL) resources in a time domain multiplexed (TDM'ed) manner, and coordinate transmission timings between a plurality of group member user equipments (UEs) in a unicast session or a groupcast session.

According to an embodiment in conjunction to the first aspect of the present disclosure, the local header is a base station (BS), a BS-type road side unit (RSU) or a UE-type RSU, the local header does not directly participate in the unicast session or the groupcast session as part of a group, and the local header is as an SL resource controller for the unicast session or the groupcast session.

According to an embodiment in conjunction to the first aspect of the present disclosure, the local header is one of the group member UEs, and the local header directly participates in exchanging vehicle-to-everything (V2X) data with other group member UEs in the unicast session or the groupcast session.

According to an embodiment in conjunction to the first aspect of the present disclosure, the processor is configured to pre-allocate the transmission opportunities of the sidelink (SL) resources in a fair-proportional manner by assigning a start timing or a reference timing, and a UE transmission sequence or a UE member ID for each of the group member UEs.

According to an embodiment in conjunction to the first aspect of the present disclosure, the transmission opportunities of the sidelink (SL) resources are equally distributed among the group member UEs in the fair-proportional manner.

According to an embodiment in conjunction to the first aspect of the present disclosure, the start timing for a first transmission where a transmission coordination begins and the UE transmission sequence are indicated to the group member UEs.

According to an embodiment in conjunction to the first aspect of the present disclosure, the start time is expressed in a system frame number (SFN) and/or a slot number within a radio frame.

According to an embodiment in conjunction to the first aspect of the present disclosure, the reference timing for a first transmission where a transmission coordination begins and the UE member ID are indicated to the group member UEs.

According to an embodiment in conjunction to the first aspect of the present disclosure, the reference time is expressed in a system frame number (SFN) and/or a slot number within a radio frame.

According to an embodiment in conjunction to the first aspect of the present disclosure, each of the group member UEs based on a corresponding UE member ID computes the transmission timings in which each of the group member UEs is allowed to transmit a plurality of SL messages according to a following modulo equation: (SFN x 10+slot number) mod (number of group member UEs)=UE member ID-1.

According to an embodiment in conjunction to the first aspect of the present disclosure, the processor is configured to pre-allocate the transmission opportunities of the sidelink (SL) resources by assigning a start timing and a slot bitmap sequence for each of the group member UEs.

According to an embodiment in conjunction to the first aspect of the present disclosure, the slot bitmap sequence is flexibly changed or updated.

According to an embodiment in conjunction to the first aspect of the present disclosure, the slot bitmap sequence has a finite length of x bits, where the x is one of {6, 8, or 10 bits}.

According to an embodiment in conjunction to the first aspect of the present disclosure, the processor is configured to allocate a plurality of different frequency resources to each of the group member UEs to further separate transmissions from different group member UEs in a frequency domain.

According to an embodiment in conjunction to the first aspect of the present disclosure, the processor is configured to assist the group member UEs in a selection of SL resources but not directly assign the SL resources for a data transport block (TB) transmission.

According to an embodiment in conjunction to the first aspect of the present disclosure, the group member UEs on its own decide on which of pre-allocated transmission opportunities to use for transmitting data TBs.

In a second aspect of the present disclosure, a method of vehicle-to-everything (V2X) communication of an apparatus is provided. The apparatus is a local header. The method includes pre-allocating a plurality of transmission opportunities of a plurality of sidelink (SL) resources in a time domain multiplexed (TDM'ed) manner, and coordinating transmission timings between a plurality of group member user equipments (UEs) in a unicast session or a groupcast session.

According to an embodiment in conjunction to the second aspect of the present disclosure, the local header is a base station (BS), a BS-type road side unit (RSU) or a UE-type RSU, the local header does not directly participate in the unicast session or the groupcast session as part of a group, and the local header is as an SL resource controller for the unicast session or the groupcast session.

According to an embodiment in conjunction to the second aspect of the present disclosure, the local header is one of the group member UEs, and the local header directly participates in exchanging vehicle-to-everything (V2X) data with other group member UEs in the unicast session or the groupcast session.

According to an embodiment in conjunction to the second aspect of the present disclosure, the method further includes pre-allocating the transmission opportunities of the sidelink (SL) resources in a fair-proportional manner by assigning a start timing or a reference timing, and a UE transmission sequence or a UE member ID for each of the group member UEs.

According to an embodiment in conjunction to the second aspect of the present disclosure, the transmission opportunities of the sidelink (SL) resources are equally distributed among the group member UEs in the fair-proportional manner.

According to an embodiment in conjunction to the second aspect of the present disclosure, the start timing for a first transmission where a transmission coordination begins and the UE transmission sequence are indicated to the group member UEs.

According to an embodiment in conjunction to the second aspect of the present disclosure, the start time is expressed in a system frame number (SFN) and/or a slot number within a radio frame.

According to an embodiment in conjunction to the second aspect of the present disclosure, the reference timing for a first transmission where a transmission coordination begins and the UE member ID are indicated to the group member UEs.

According to an embodiment in conjunction to the second aspect of the present disclosure, the reference time is expressed in a system frame number (SFN) and/or a slot number within a radio frame.

According to an embodiment in conjunction to the second aspect of the present disclosure, each of the group member UEs based on a corresponding UE member ID computes the transmission timings in which each of the group member UEs is allowed to transmit a plurality of SL messages according to a following modulo equation: (SFN x 10+slot number) mod (number of group member UEs)=UE member ID-1.

According to an embodiment in conjunction to the second aspect of the present disclosure, the method further includes pre-allocating the transmission opportunities of the sidelink (SL) resources by assigning a start timing and a slot bitmap sequence for each of the group member UEs.

According to an embodiment in conjunction to the second aspect of the present disclosure, the slot bitmap sequence is flexibly changed or updated.

According to an embodiment in conjunction to the second aspect of the present disclosure, the slot bitmap sequence has a finite length of x bits, where the x is one of {6, 8, or 10 bits}.

According to an embodiment in conjunction to the second aspect of the present disclosure, the method further includes allocating a plurality of different frequency resources to each of the group member UEs to further separate transmissions from different group member UEs in a frequency domain.

According to an embodiment in conjunction to the second aspect of the present disclosure, the method further includes assisting the group member UEs in a selection of SL resources but not directly assign the SL resources for a data transport block (TB) transmission.

According to an embodiment in conjunction to the second aspect of the present disclosure, the group member UEs on its own decide on which of pre-allocated transmission opportunities to use for transmitting data TBs.

According to an embodiment, a non-transitory machine-readable storage medium stores thereon instructions that, when executed by a computer, cause the computer to perform the above method.

According to an embodiment, a terminal device includes a processor and a memory configured to store a computer program. The processor is configured to execute the computer program stored in the memory to perform the above method.

According to an embodiment, a network base station (BS) includes a processor and a memory configured to store a computer program. The processor is configured to execute the computer program stored in the memory to perform the above method.

In the embodiment of the present disclosure, the apparatus and the method of vehicle-to-everything (V2X) communication of same aim to solve half-duplex ("hear-ability") and transmission (Tx) collision problems by pre-allocating the transmission opportunities of the SL resources in the TDM'ed manner, and coordinating transmission timings between the group member UEs in the unicast session or the groupcast session.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 1:
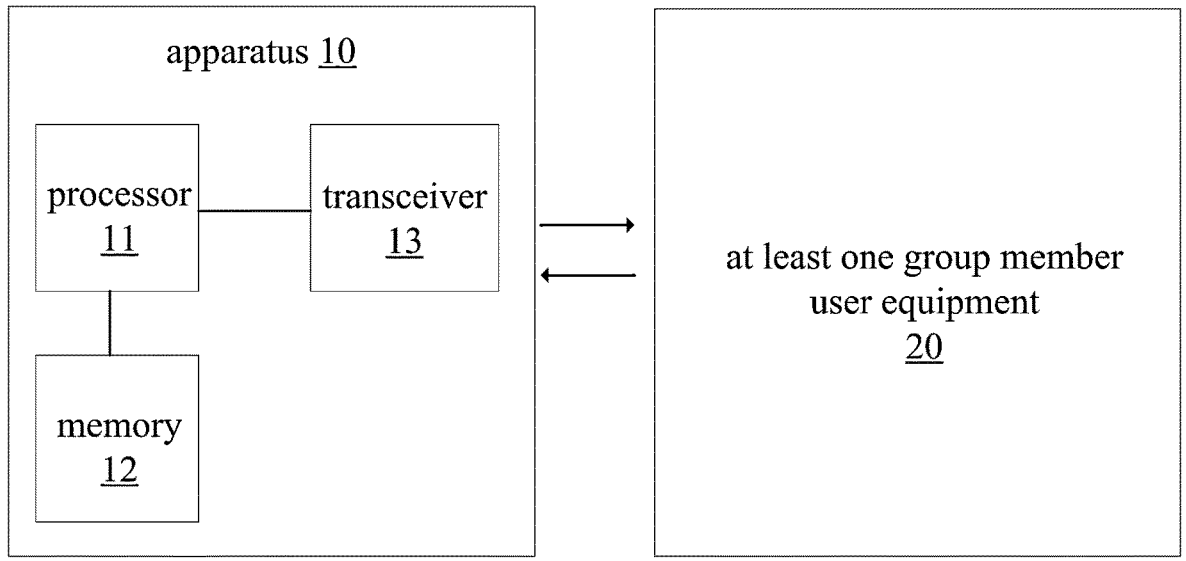
FIG. 1 is a block diagram of an apparatus for pre-allocating, to at least one group member user equipment (UE) of a unicast session or a groupcast session, plurality of transmission opportunities of a plurality of SL resources in a 5th generation new radio (5G-NR) vehicle-to-everything (V2X) communication system according to an embodiment of the present disclosure.

FIG. 1 illustrates that, in some embodiments, an apparatus 10 for pre-allocating, to at least one group member user equipment UE of a unicast session or a groupcast session, plurality of transmission opportunities of a plurality of SL resources in a 5th generation new radio (5G-NR) vehicle-to-everything (V2X) communication system according to an embodiment of the present disclosure. The apparatus 10 may include a processor 11, a memory 12 and a transceiver 13. The processor 11 may be configured to implement proposed functions, procedures and/or methods described in this description. Layers of radio interface protocol may be implemented in the processor 11. The memory 12 is operatively coupled with the processor 11 and stores a variety of information to operate the processor 11. The transceiver 13 is operatively coupled with the processor 11, and transmits and/or receives a radio signal.

The processor 11 may include application-specific integrated circuit (ASIC), other chipset, logic circuit and/or data processing device. The memory 12 may include read-only memory (ROM), random access memory (RAM), flash memory, memory card, storage medium and/or other storage device. The transceiver 13 may include baseband circuitry to process radio frequency signals. When the embodiments are implemented in software, the techniques described herein can be implemented with modules (e.g., procedures, functions, and so on) that perform the functions described herein. The modules can be stored in the memory 12 and executed by the processor 11. The memory 12 can be implemented within the processor 11 or external to the processor 11 in which case those can be communicatively coupled to the processor 11 via various means as is known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) new radio (NR) Release 16 and beyond. UEs are communicated with each other directly via a sidelink interface such as a PC5 interface.

In some embodiments, the apparatus 10 is a local header. The processor 11 is configured to pre-allocate a plurality of transmission opportunities of a plurality of sidelink (SL) resources in a time domain multiplexed (TDM'ed) manner, and coordinate transmission timings between a plurality of group member user equipments (UEs) 20 in a unicast session or a groupcast session.

Figure 2:
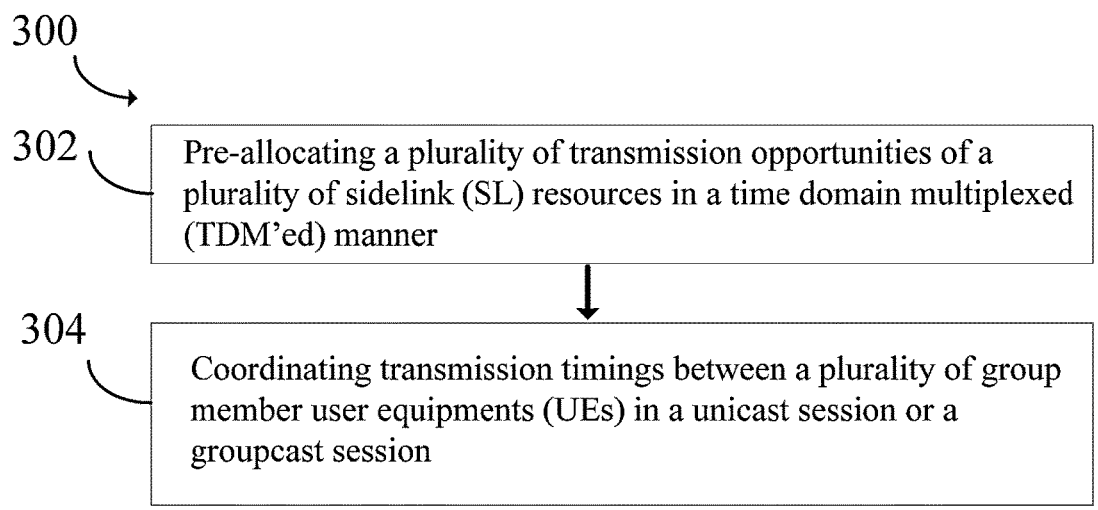
FIG. 2 is a flowchart illustrating a method of 5G-NR V2X communication of an apparatus according to an embodiment of the present disclosure.

FIG. 2 illustrates a method 300 of 5G-NR V2X communication of the apparatus 10 according to an embodiment of the present disclosure.

The method 300 includes: at block 302, pre-allocating a plurality of transmission opportunities of a plurality of sidelink (SL) resources in a time domain multiplexed (TDM'ed) manner, and at block 304, coordinating transmission timings between a plurality of group member user equipments (UEs) 20 in a unicast session or a groupcast session.

In the embodiment of the present disclosure, the apparatus 10 and the method 300 of vehicle-to-everything (V2X) communication of same aim to solve half-duplex ("hearability") and transmission (Tx) collision problems by pre-allocating the transmission opportunities of the SL resources in the TDM'ed manner, and coordinating transmission timings between the group member UEs 20 in the unicast session or the groupcast session.

In some embodiments, of a proposed method of local header assisted pre-allocation of SL resources for coordinating transmission (Tx) timing between group member UEs 20 in a unicast or a groupcast session for 5G-NR sidelink (SL) communication, the local header 10 can be a base station (BS), a BS-type road side unit (RSU) or a UE-type RSU that are not directly participating in the unicast/groupcast session as part of the group, but as an SL resource controller for the unicast/groupcast session. Alternatively, the local header 10 can also be a group member UE directly participating in exchanging vehicle-to-everything (V2X) data with other group member UEs 20 in the unicast/groupcast session. To coordinate Tx timing between group member UEs 20 within the unicast/groupcast session, the local header 10 pre-allocates Tx opportunities of SL resources according to one of the two following schemes.

Scheme 1: SL resource Tx opportunities are equally distributed among group member UEs 20 in a fair-proportional manner. Once the Tx timings are indicated/pre-allocated by the local header 10, it is then up to the individual group member UE 20 to decide the exact timing and size of SL resource(s) to transmit its message TBs based on its V2X traffic needs (e.g. to satisfy a certain latency requirement or matching to a certain traffic periodicity). One of the following two methods of timing indication could be used.

Timing indication method 1: A start timing (e.g. system frame number (SFN) and/or a slot number within a radio frame) for very first transmission (where Tx coordination begins) and a UE transmission sequence are indicated to all group member UEs. For the UE transmission sequence, the local header 10 indicates first one is UE_1, followed by UE_2, UE_3, UE_4, and then UE_5 as an example. Then from the indicated start timing, this sequence repeats itself until it is indicated otherwise (e.g. a new UE transmission sequence).

Timing indication method 2: A reference timing (e.g. SFN and/or a slot number within a radio frame) for very first transmission (where Tx coordination begins) and a UE member ID are indicated to the group member UEs. Each group member UE based on its UE member ID (e.g. 1, 2, 3 and etc.) computes the Tx timings in which it is allowed to transmit SL messages that satisfy the following modulo equation.

(SFN×10+slot number) mod (number of group member UEs)=UE member ID−1    (1)

Figure 3:
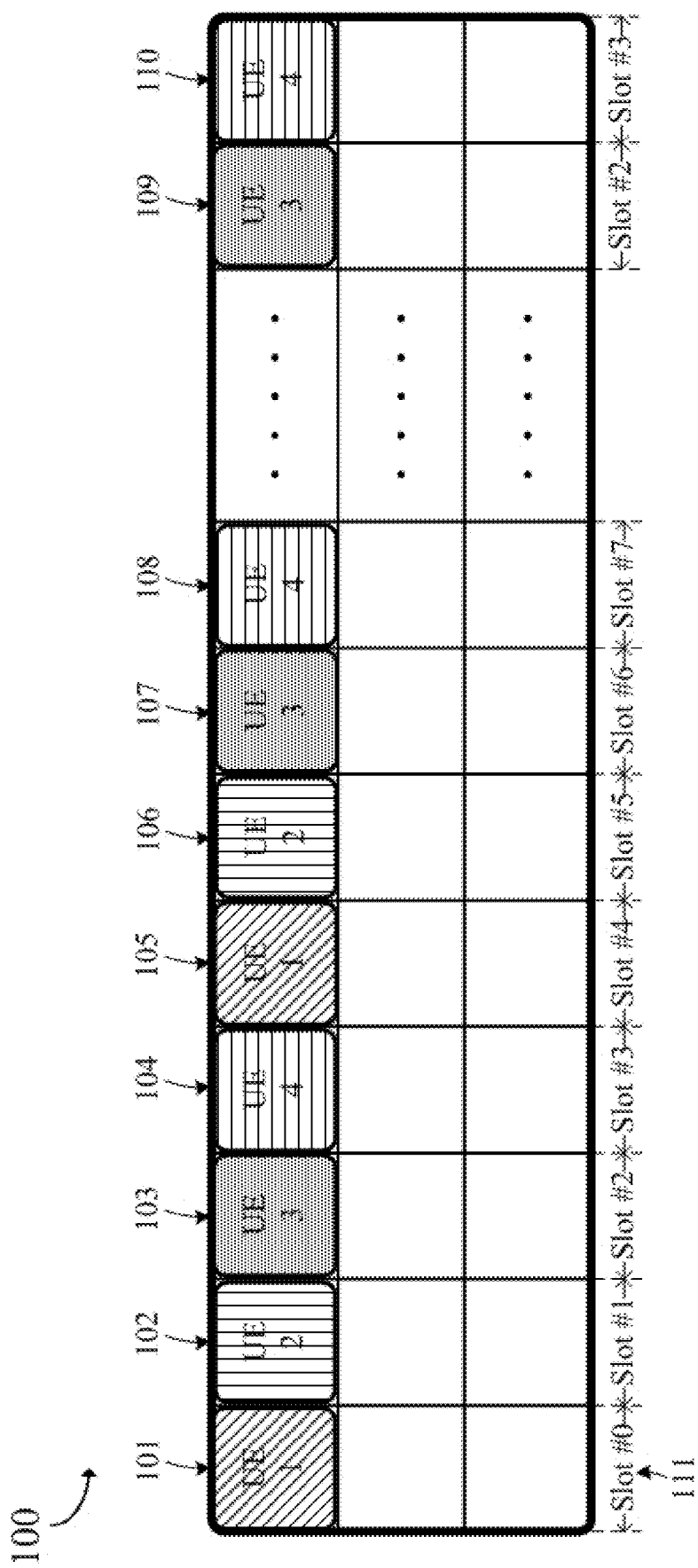
FIG. 3 is a schematic diagram of exemplary illustration of fair-proportional sharing of SL resources between group member UEs to an embodiment of the present disclosure.

In reference to FIG. 3, local header assisted pre-allocation of SL resources for coordinating transmission (Tx) timing between four group member UEs in a groupcast session is exemplary illustrated within a sidelink resource pool 100, where a duration of an SL resource is one slot length. Using timing indication method 2, the group headers indicates a reference timing to be slot number 0 (111) to group member UEs and assigns each group member UE with a UE member ID as:

Group member UE 1 (UE 1) has a UE member ID=1
Group member UE 2 (UE 2) has a UE member ID=2
Group member UE 3 (UE 3) has a UE member ID=3
Group member UE 4 (UE 4) has a UE member ID=4

Based on this indicated information and using the modulo equation (1), each group member UE determines Tx opportunities as: UE 1 is pre-allocated with SL resources 101 and 105, UE 2 is pre-allocated with SL resources 102 and 106 in FIG. 3, UE 3 is pre-allocated with SL resources 103, 107, and 109, and UE 4 is pre-allocated with SL resources 104, 108, and 110.

Scheme 2: SL resource Tx opportunities are pre-allocated to each group member UE in a unicast/groupcast session using a bitmap sequence to represent the Tx opportunities. It is then up to the individual group member UE to decide the exact timing and size of SL resource(s) to transmit its message TBs based on its V2X traffic needs (e.g. to satisfy a certain latency requirement or matching to a certain traffic periodicity).

For the Tx opportunity pre-allocation, the group header assigns a unique bitmap sequence for each group member UE and indicates a start timing slot where group member UEs can begin to apply their individually assigned bitmap sequence. The bitmap sequence has a finite length of x bits, where the x can be one of {6, 8, or 10 bits} as an example. Beginning from the start timing slot, the group member UEs apply their bit map sequence for x number of slots. Then after x number of slots, the UEs can repeat same bitmap sequence for a next x number of slots, until the UEs are indicated otherwise (e.g. a new bitmap sequence) or terminated. For all the slots that have been marked/mapped with "1", the group member UE treats the slot timing as being a Tx opportunity, and vice-versa. Group member UEs with heavier V2X traffic or more messages can be allocated with more ones in the bitmap.

Figure 4:
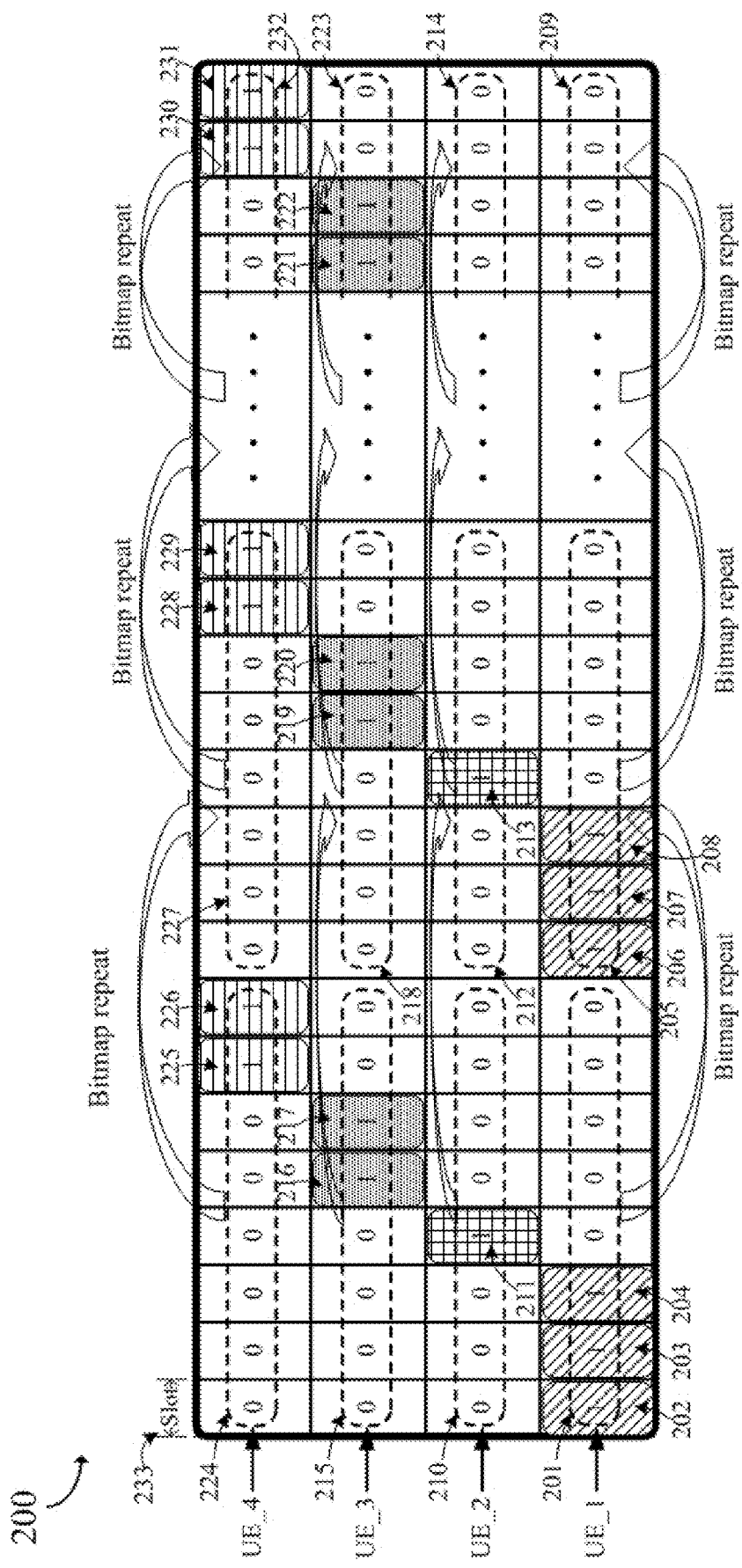
FIG. 4 is a schematic diagram of exemplary illustration of bitmap indication of transmission (Tx) timing for group member UEs according to an embodiment of the present disclosure.

In reference to FIG. 4, local header assisted pre-allocation of SL resources using Scheme 2 for coordinating transmission (Tx) timing between four group member UEs in a groupcast session is exemplary illustrated within a sidelink resource pool (200), where a duration of an SL resource is one slot length 233. For four group member UEs, the local header indicates a start timing from slot 233 that is common to all UEs and assigns for each UE an individual bitmap sequence as follows.

For UE_1, the bitmap is {1, 1, 1, 0, 0, 0, 0, 0}
For UE_2, the bitmap is {0, 0, 0, 1, 0, 0, 0, 0}
For UE_3, the bitmap is {0, 0, 0, 0, 1, 1, 0, 0}
For UE_4, the bitmap is {0, 0, 0, 0, 0, 0, 1, 1}

The local header also allocates different frequency resource to each group member UE to further separate transmissions from different UE in the frequency domain. Based on this information provided by the group header, group member UEs apply their assigned bitmap sequences and determine their Tx opportunities as the followings.

For UE_1, the bitmap 201 is applied from slot 233 and repeated in 205 and so on up to 209. From the bitmap sequence, the UE determines its Tx opportunities that can be used for SL transmissions in SL resources 202, 203, 204, 206, 207, 208, and so on.

For UE_2, the bitmap 210 is applied from slot 233 and repeated in 212 and so on up to 214. From the bitmap sequence, the UE determines its Tx opportunities that can be used for SL transmissions in SL resources 211, 213, and so on.

For UE_3, the bitmap 215 is applied from slot 233 and repeated in 218 and so on up to 223. From the bitmap sequence, the UE determines its Tx opportunities that can be used for SL transmissions in SL resources 216, 217, 219, 220, and so on up to 221 and 222.

For UE_4, the bitmap 224 is applied from slot 233 and repeated in 227 and so on up to 232. From the bitmap sequence, the UE determines its Tx opportunities that can be used for SL transmissions in SL resources 225, 226, 228, 229, and so on up to 230 and 231.

In some embodiments, SL resource Tx opportunities are coordinated and pre-allocated by a local header in a simple TDM'ed manner between group member UEs in a unicast or a groupcast SL communication session.

In Scheme 1, by assigning a start timing, and a UE transmission sequence or a UE member ID from the local header, group member UEs are pre-allocated with SL Tx opportunities (slot timings) in a fair-proportional manner.

In scheme 2, by assigning s start timing and a slot bitmap sequence from the local header, group member UEs are pre-allocated with SL Tx opportunities (slot timings). The slot bitmap sequence can be flexibly changed/updated if required.

In either scheme, the local header assisted group member UEs only in SL resources selection but not directly assigning SL resources for data TB transmission. Group member UEs on its own decide on which of the pre-allocated Tx opportunities to use for data TB transmissions.

In some embodiment, it aims to solve the above described half-duplex limitation and Tx collision problem in sidelink unicast and groupcast communications by introducing assisted coordination using pre-allocation of SL resources from local header in a time domain multiplexed (TDM'ed) manner for group member UEs. Benefits include at least one of the followings.

1. Maximizing "hear-ability" among group member UEs (centralized resource scheduling/assignment by a common local header to avoid SL transmissions from multiple UEs at same time and not being able to "hear" each other's messages, commonly known as half-duplex limitation).

2. Minimizing Tx collisions among group member UEs and as well as collisions with other UEs outside the group, to improve packet transmission reliability and thus overall system performance (PRR), especially for high priority messages. As a result, this can minimize number of retransmissions of the same message TB and thus saving latency delay and UE Tx and processing power.

Figure 5:
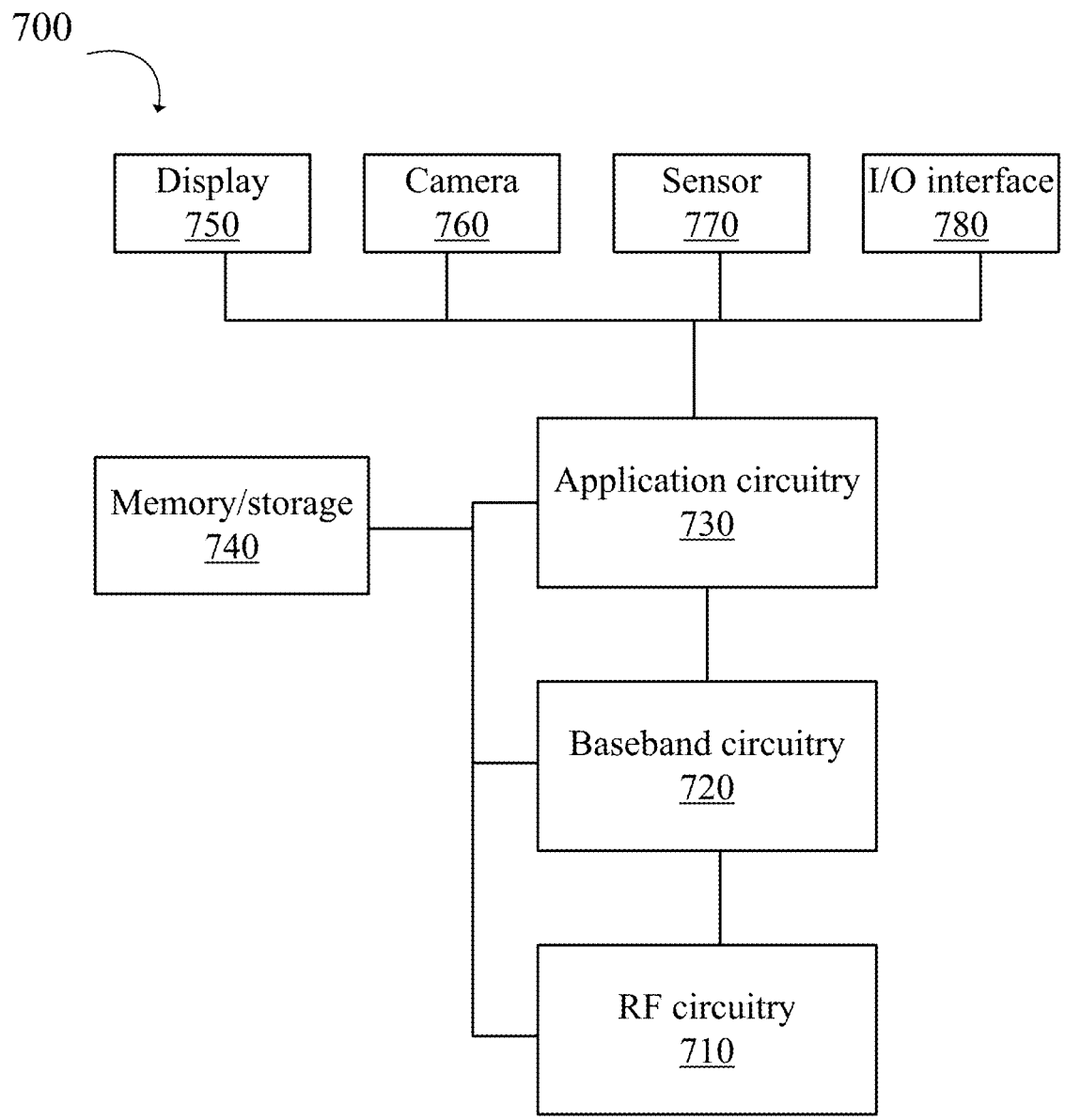
FIG. 5 is a block diagram of a system for wireless communication according to an embodiment of the present disclosure.

FIG. 5 is a block diagram of a system 700 for wireless communication according to an embodiment of the present disclosure. Embodiments described herein may be implemented into the system using any suitably configured hardware and/or software. FIG. 5 illustrates, for one embodiment, an example system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, system may have more or less components, and/or different architectures. Where appropriate, methods described herein may be implemented as a computer program. The computer program may be stored on a storage medium, such as a non-transitory storage medium.

In the embodiment of the present disclosure, the apparatus and the method of vehicle-to-everything (V2X) communication of same aim to solve half-duplex ("hear-ability") and transmission (Tx) collision problems by pre-allocating the transmission opportunities of the SL resources in the TDM'ed manner, and coordinating transmission timings between the group member UEs in the unicast session or the groupcast session. The embodiment of the present disclosure is a combination of techniques/processes that can be adopted in 3GPP specification to create an end product.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. An apparatus in a vehicle-to-everything (V2X) communication system, the apparatus being a local header and comprising:
   a memory;
   a transceiver; and
   a processor coupled to the memory and the transceiver, wherein the processor is configured to:
      pre-allocate a plurality of transmission opportunities of a plurality of sidelink (SL) resources in a time domain multiplexed (TDM'ed) manner; and
      coordinate transmission timings between a plurality of group member user equipments (UEs) in a unicast session or a groupcast session,
   wherein the processor is configured to pre-allocate the transmission opportunities of the sidelink (SL) resources in a fair-proportional manner by assigning a start timing or a reference timing, and a UE transmission sequence or a UE member ID for each of the group member UEs, and each of the group member UEs based on a corresponding UE member ID computes the transmission timings in which each of the group member UEs is allowed to transmit a plurality of SL messages according to a following modulo equation: (SFN×10+slot number) mod (number of group member UEs)=UE member ID−1; or
   wherein the processor is configured to pre-allocate the transmission opportunities of the sidelink (SL) resources by assigning a start timing and a slot bitmap sequence for each of the group member UEs.

2. The apparatus of claim 1, wherein the local header is one of the group member UEs, and the local header directly participates in exchanging vehicle-to-everything (V2X) data with other group member UEs in the unicast session or the groupcast session.

3. The apparatus of claim 1, wherein the slot bitmap sequence is flexibly changed or updated.

4. A method of vehicle-to-everything (V2X) communication of an apparatus, the apparatus being a local header, the method comprising:
   pre-allocating a plurality of transmission opportunities of a plurality of sidelink (SL) resources in a time domain multiplexed (TDM'ed) manner; and
   coordinating transmission timings between a plurality of group member user equipments (UEs) in a unicast session or a groupcast session,
   wherein the method further comprises pre-allocating the transmission opportunities of the sidelink (SL) resources in a fair-proportional manner by assigning a start timing or a reference timing, and a UE transmission sequence or a UE member ID for each of the group member UEs, and each of the group member UEs based on a corresponding UE member ID computes the transmission timings in which each of the group member UEs is allowed to transmit a plurality of SL messages according to a following modulo equation: (SFN×10+slot number) mod (number of group member UEs)=UE member ID−1; or
   wherein the method further comprises pre-allocating the transmission opportunities of the sidelink (SL) resources by assigning a start timing and a slot bitmap sequence for each of the group member UEs.

5. The method of claim 4, wherein the local header is one of the group member UEs, and the local header directly participates in exchanging vehicle-to-everything (V2X) data with other group member UEs in the unicast session or the groupcast session.

6. The method of claim 4, wherein the slot bitmap sequence is flexibly changed or updated.

* * * * *